(12) United States Patent
Yokoyama et al.

(10) Patent No.: US 9,278,722 B2
(45) Date of Patent: Mar. 8, 2016

(54) STEP STRUCTURE FOR SADDLE-RIDE TYPE VEHICLE (71) Applicant: HONDA MOTOR CO., LTD., Tokyo (JP)

(72) Inventors: Yuichi Yokoyama, Wako (JP); Mitsuyoshi Kohama, Wako (JP); Tetsuya Nakazawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/622,037

(22) Filed: Feb. 13, 2015

(65) Prior Publication Data

US 2015/0239520 A1 Aug. 27, 2015

(30) Foreign Application Priority Data

Feb. 21, 2014 (JP) ................................. 2014-031557

(51) Int. Cl.
*B60R 3/00* (2006.01)
*B62J 25/00* (2006.01)

(52) U.S. Cl.
CPC ....................................... *B62J 25/00* (2013.01)

(58) Field of Classification Search
CPC ............ B60R 3/00; B60R 3/002; B62J 25/00; Y10T 74/20918
See application file for complete search history.

(56) References Cited

U.S. PATENT DOCUMENTS

| 4,546,993 | A | * | 10/1985 | Walker | 280/291 |
|---|---|---|---|---|---|
| 5,090,715 | A | * | 2/1992 | Nakajima et al. | 280/166 |
| 5,454,580 | A | * | 10/1995 | Lin | 280/291 |
| 6,719,316 | B1 | * | 4/2004 | Anthony | 280/291 |
| 7,111,375 | B2 | * | 9/2006 | Buckhouse et al. | 29/428 |
| 7,114,739 | B2 | * | 10/2006 | Colano | 280/291 |
| 7,270,212 | B2 | * | 9/2007 | Takahashi et al. | 180/219 |
| 7,404,568 | B1 | * | 7/2008 | Portelance et al. | 280/291 |
| 7,431,118 | B1 | * | 10/2008 | Hogg | 180/219 |
| 7,497,291 | B1 | * | 3/2009 | McKim | 180/90.6 |
| 7,559,567 | B2 | * | 7/2009 | Shimomura | 280/291 |
| D599,712 | S | * | 9/2009 | Warren | D12/114 |
| 7,823,900 | B2 | * | 11/2010 | Warren | 280/291 |
| 7,828,315 | B2 | * | 11/2010 | Owyang | 280/291 |
| 7,976,043 | B2 | * | 7/2011 | Yoshizawa | 280/166 |
| 7,992,885 | B2 | * | 8/2011 | Ishikawa et al. | 280/291 |
| 8,083,248 | B1 | * | 12/2011 | Gulley | 280/291 |
| 8,870,207 | B2 | * | 10/2014 | Parvey | 280/166 |
| 2005/0012300 | A1 | * | 1/2005 | Egan | 280/291 |
| 2005/0109552 | A1 | * | 5/2005 | Nakabayashi et al. | 180/68.1 |
| 2005/0253359 | A1 | * | 11/2005 | Egan | 280/304.3 |
| 2005/0269799 | A1 | * | 12/2005 | Takahashi et al. | 280/291 |
| 2005/0269800 | A1 | * | 12/2005 | Suzuki et al. | 280/291 |
| 2007/0062327 | A1 | * | 3/2007 | Kouchi et al. | 74/564 |
| 2007/0216188 | A1 | * | 9/2007 | Nakabayashi et al. | 296/75 |

(Continued)

FOREIGN PATENT DOCUMENTS

JP 2003-054465 A 2/2003

*Primary Examiner* — J. Allen Shriver, II
*Assistant Examiner* — Jacob Meyer
(74) *Attorney, Agent, or Firm* — Birch, Stewart, Kolasch & Birch, LLP (57) ABSTRACT A step structure for a saddle-ride vehicle includes a step that is turned in a freely derricking manner between a usage state raised in a vehicle width direction and a storage state falling along a lateral side of a vehicle. In the step structure for the saddle-ride vehicle, the step is turnably arranged with a shaft provided at an end of the step as the center. The step is also stored in such a manner wherein the shaft is positioned at the rear of the step in the storage state.

17 Claims, 7 Drawing Sheets

(56) References Cited

U.S. PATENT DOCUMENTS

| | | |
|---|---|---|
| 2008/0238032 A1* | 10/2008 | Ishikawa et al. .............. 280/291 |
| 2010/0127474 A1* | 5/2010 | Jans .............................. 280/291 |
| 2010/0175942 A1* | 7/2010 | Griep et al. .................. 180/90.6 |
| 2010/0187792 A1* | 7/2010 | Warren ......................... 280/291 |
| 2012/0074667 A1* | 3/2012 | Matsushima et al. ......... 280/291 |
| 2012/0205888 A1* | 8/2012 | Parvey .......................... 280/163 |
| 2014/0175138 A1* | 6/2014 | Mann ............................ 224/419 |

\* cited by examiner

STEP STRUCTURE FOR SADDLE-RIDE TYPE VEHICLE

CROSS-REFERENCE TO RELATED APPLICATIONS

The present application claims priority under 35 USC 119 to Japanese Patent Application No. 2014-031557 filed Feb. 21, 2014 the entire contents of which are hereby incorporated by reference.

BACKGROUND OF THE INVENTION

1. Field of the Invention

The present invention relates to a step structure for a saddle-ride type vehicle.

2. Description of Background Art

The existing step structure for a saddle-ride type vehicle is configured in such a manner that a pillion step as a footrest for a pillion passenger is made to be moved upwardly to a rear side for storage. See, for example, JP-A No. 2003-54465.

When the pillion step is made to be moved upwardly to the rear side for storage, the pillion step that is directed upwardly to the rear, when viewed from in a side view, is always visually recognized as a projection that is unnecessary from the standpoint of the appearance in the case of a single passenger vehicle. In this case, the presence of the projection that is directed upwardly to the rear in the side view that is unnecessary from the standpoint of appearance cannot be removed. Thus, it is possibility that the designability of the whole vehicle is decreased. As a result, there is a need for a structure that can improve the designability of the whole vehicle.

SUMMARY AND OBJECTS OF THE INVENTION

In view of the above-mentioned circumstances, an object of an embodiment of the present invention is to improve designability of the whole vehicle in a step structure for a saddle-ride type vehicle.

In order to achieve the above-mentioned problem, according to an embodiment of the present invention, there is provided a step structure for a saddle-ride type vehicle (1) including a step (18, 19) that is turned in a freely derricking manner between a usage state raised in a vehicle width direction and a storage state falling along a lateral side of a vehicle. The step (19) is turnably arranged with a shaft (39) provided at an end (19a) of the step (19) as the center, and also is stored in such a manner that the shaft (39) is positioned at the rear of the step (19) in the storage state.

According to an embodiment of the present invention, the step (18, 19) includes a pillion step (19) that is configured to place the feet of a pillion passenger thereon. A main step (18) is arranged in front of the pillion step (19) and that is configured to place the feet of a rider thereon. The pillion step (19) is made to be moved toward a side of the main step (18) in the storage state.

According to an embodiment of the present invention, the shaft (39), the pillion step (19), and the main step (18) are provided to a holder (30).

According to an embodiment of the present invention, the holder (30) is provided with a storage portion (37) that is recessed inwardly in the vehicle width direction and that is configured to store the step (19).

According to an embodiment of the present invention, the step structure for the saddle-ride type vehicle further includes locking means (38) that prevents the step (19) from falling forward in the usage state of the step (19).

According to an embodiment of the present invention, the step (19) is provided within the holder (30), the holder (30) is provided with the storage portion (37) that is recessed inwardly in the vehicle width direction, and that is configured to store the step (19). The locking means (38) is provided with a stepped portion (38) that is formed below the storage portion (37).

According to an embodiment of the present invention, the stepped portion (38) has a first inclined surface (38g1) that is inclined to face in a rearward direction and downward. In addition, the step (19) is provided with an inclined portion (19g1) that is inclined to be arranged along the first inclined surface (38g1) in the usage state.

According to an embodiment of the present invention, the step (19) is moved downward along the shaft (39) in the usage state in order to lock the inclined portion (19g1) to the first inclined surface (38g1).

According to an embodiment of the present invention, the step (19) is provided within the holder (30), and the holder (30) further has a second inclined surface (34g2) behind the step (19) in the storage state. The second inclined surface (34g2) is inclined to face forward and upwardly.

According to an embodiment of the present invention, when the step (19) is turned in a rearward direction from the usage state, the step (19) is made to slidably contact with the second inclined surface (34g2) and moved upwardly.

According to an embodiment of the present invention, the step (19) is provided within the holder (30), the holder (30) is formed with an opening (36) that is opened at least outwardly in the vehicle width direction. In addition, the step (19) has an operating portion (19f2) that is arranged along an edge of the opening (36) in the storage state.

According to an embodiment of the present invention, the step (19) is provided within the holder (30), and the pillion step (19) of the step (19), configured to place the feet of the pillion passenger thereon, is arranged in the vicinity of a muffler (24b). The holder (30) is formed into a triangular shape that projects in a rearward direction in a side view. At least a front top (30a, 30b) of the holder (30) is attached to a vehicle body frame (5) with a muffler stay (24c) for supporting the muffler (24b) being attached to a rear top (30c) of the holder (30).

According to an embodiment of the present invention, since the step is made to fall forward so as to be stored, even in the case of the single passenger vehicle, the projection that is directed upwardly to the rear in the side view and that is unnecessary from the standpoint of appearance can be removed. For this reason, the designability of the whole vehicle can be improved.

According to an embodiment of the present invention, since the pillion step is made to fall toward the main step when the pillion step is not used, the end of the pillion step is brought close to the rider. For this reason, the degree of freedom in design can be improved. Also, in comparison with the structure that the end of the pillion step is kept away from the rider, the pillion step can be made inconspicuous.

According to an embodiment of the present invention, since the shaft, the pillion step, and the main step are collected into the holder, the shaft, the pillion step, and the main step are easily assembled in the holder. For this reason, productivity can be improved. Also, since such a design wherein the shaft, the pillion step, the main step, and the holder are integrated with each other can be achieved, designability can be improved.

According to an embodiment of the present invention, the step can be hidden in the storage portion. For this reason, appearance quality in a planar view can be ensured.

According to an embodiment of the present invention, the locking means can prevent the step from falling forward. For this reason, the performance of the footrest for an occupant can be ensured.

According to an embodiment of the present invention, the stepped portion can reliably and easily prevent the step from falling forward. Also, since the storage portion is arranged above the stepped portion, when the step is stored, the step can be pulled up with the intention.

According to an embodiment of the present invention, the step has to be manually pulled up when the step is stored. However, the step cannot be pulled up because the inclined portion is caught on the first inclined surface when the step is merely pulled upwardly. More specifically, when the step is stored, the step has to be pulled up once the step is made to fall in a rearward direction. For this reason, the step can be reliably manually pulled up.

According to an embodiment of the present invention, the step is made to fall in a rearward direction along the second inclined surface so that the step can be lifted. In addition, the step can be made to fall forward after the step is lifted. For this reason, handleability when the step is stored can be improved.

According to an embodiment of the present invention, since such design that the operating portion of the step and the opening are integrated with each other is achieved, designability can be improved. Also, since the pillion step can be pulled up by the operating portion of the step arranged along the edge of the opening, handleability when the step is stored can be improved.

According to an embodiment of the present invention, since the pillion step and the muffler stay are collected into the holder, the pillion step and the muffler stay are easily assembled in the holder. As a result, productivity can be improved. Also, the muffler stay is attached to the rear top of the holder. For this reason, in comparison with the structure that an attaching portion for the muffler stay is separately provided, the number of components can be reduced. Also, since such a structure wherein the pillion step, the muffler stay, and the holder are integrated with each other is achieved, designability can be improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, an embodiment of the present invention will de described with reference to drawings. Note that in the following description, unless otherwise specially stated, front and rear, right and left, and the like are regarded as the same as directions as a vehicle described later. Also, note that in proper places in the drawings used for the following description, arrows are indicated, that is, the arrow FR is indicative of a forward direction of a vehicle, the arrow LH is indicative of a leftward direction of the vehicle, and the arrow UP is indicative of an upward direction of the vehicle.

Figure 1:
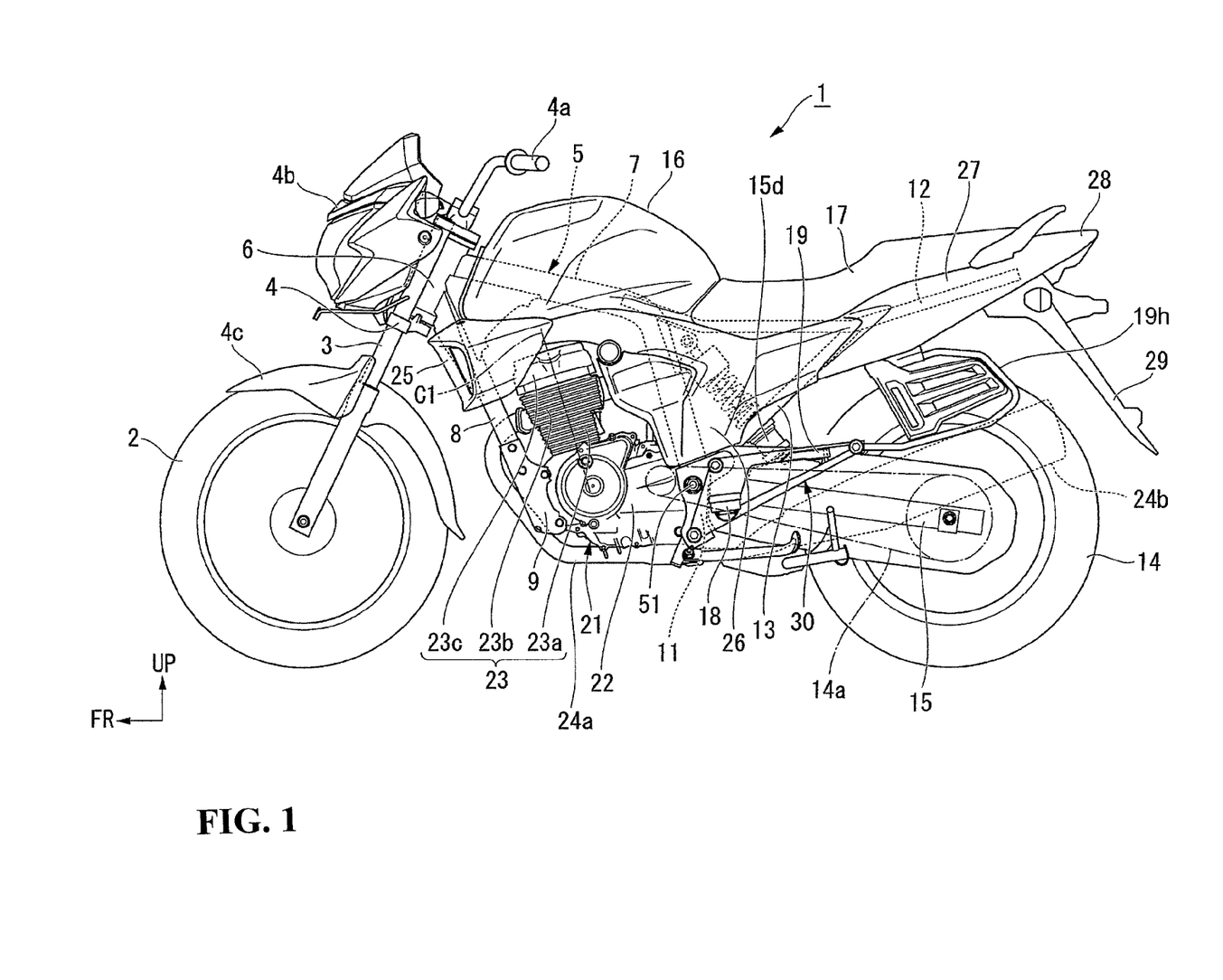
FIG. 1 is a left side view of a motorcycle according to an embodiment of the present invention.

FIG. 1 is a left side view of a motorcycle 1 according to an embodiment of the present invention.

In the motorcycle 1 (saddle-ride type vehicle) shown in FIG. 1, a front wheel 2 of the motorcycle 1 is journaled to lower ends of a pair of right and left front forks 3. Upper portions of the right and left front forks 3 are steerably pivotally supported by a head pipe 6 at a front end of a vehicle body frame 5 through a steering stem 4. A steering handlebar 4a is mounted on the steering stem 4. A front cowl 4b is mounted in front of the steering stem 4.

The vehicle body frame 5 is configured by integrally combining a plurality of various steels members together by welding or the like. The vehicle body frame 5 has a single main frame 7 that extends obliquely downwardly and in a rearward direction from a rear side of an upper portion of the head pipe 6, and that subsequently extends while being bent downwardly. A single down frame 8 extends obliquely downwardly and in a rearward direction from a rear side of a lower portion of the head pipe 6. A hanger bracket 9 is connected to a lower end of the down frame 8 with a pivot bracket 11 that is provided at a rear lower end of the main frame 7. A pair of seat rails 12 extend in a rearward direction from a rear side of a bent portion of the main frame 7 with a pair of right and left support pipes 13 that extend obliquely upwardly and in a rearward direction from a rear side of the pivot bracket 11 toward lower sides of longitudinally intermediate portions of the right and left seat rails 12.

A rear wheel 14 of the motorcycle 1 is journaled to a rear end of a swing arm 15 that extends in a longitudinal direction on a lower side of a rear portion of a vehicle body. A front end of the swing arm 15 is pivotally supported so as to be vertically swingable through a pivot shaft 51 by the pivot bracket 11 located in a longitudinally intermediate portion of the vehicle body frame 5. The rear wheel 14 is coupled to an engine 21 as a motor for the motorcycle 1 through, for example, a chain transmission mechanism 14a disposed on a left side of a rear portion of the vehicle body.

In the engine 21, a cylinder 23 is raised above a front portion of a crankcase 22 composing a lower portion of the engine 21. In the cylinder 23, in a side of the crankcase 22, a cylinder body 23a, a cylinder head 23b, and a head cover 23c are stacked up. A reference sign C1 in the drawing is indicative of a cylinder axis located along a raising direction of the cylinder 23.

A fuel tank 16 is disposed above the cylinder 23, and a seat 17 is arranged behind the fuel tank 16. In FIG. 1, a main step 18 is provided for a rider with a pillion step 19 provided for a pillion passenger seated at the rear.

An exhaust pipe 24a is connected to a front portion of the cylinder head 23b. The exhaust pipe 24a is bent across a front side and a lower side of the engine 21, and extends in a rearward direction. A muffler 24b is connected to a rear end of the exhaust pipe 24a. The muffler 24b is disposed on a right side of the rear portion of the vehicle body, and extends obliquely upwardly and in a rearward direction from a lower side of the main step 18. A dress guard 19h is provided for the pillion passenger seated at the rear.

Various kinds of synthetic resin covers are attached to a periphery of the vehicle body of the motorcycle 1. More specifically, the front cowl 4b is mounted on the steering stem 4 with a front fender 4c being attached between the right and left front forks 3. Right and left shrouds 25 are mounted on right and left sides of the front portion of the vehicle body frame 5. Right and left side covers 26 are mounted on right and left sides of the longitudinally intermediate portion of the vehicle body frame 5. Right and left rear side covers 27 are mounted on right and left sides of the rear portion of the vehicle body frame 5. A rear end cover 28 is attached at a rear end of the vehicle body frame 5. A rear fender 29 is attached below the rear end of the vehicle body frame 5.

Figure 2:
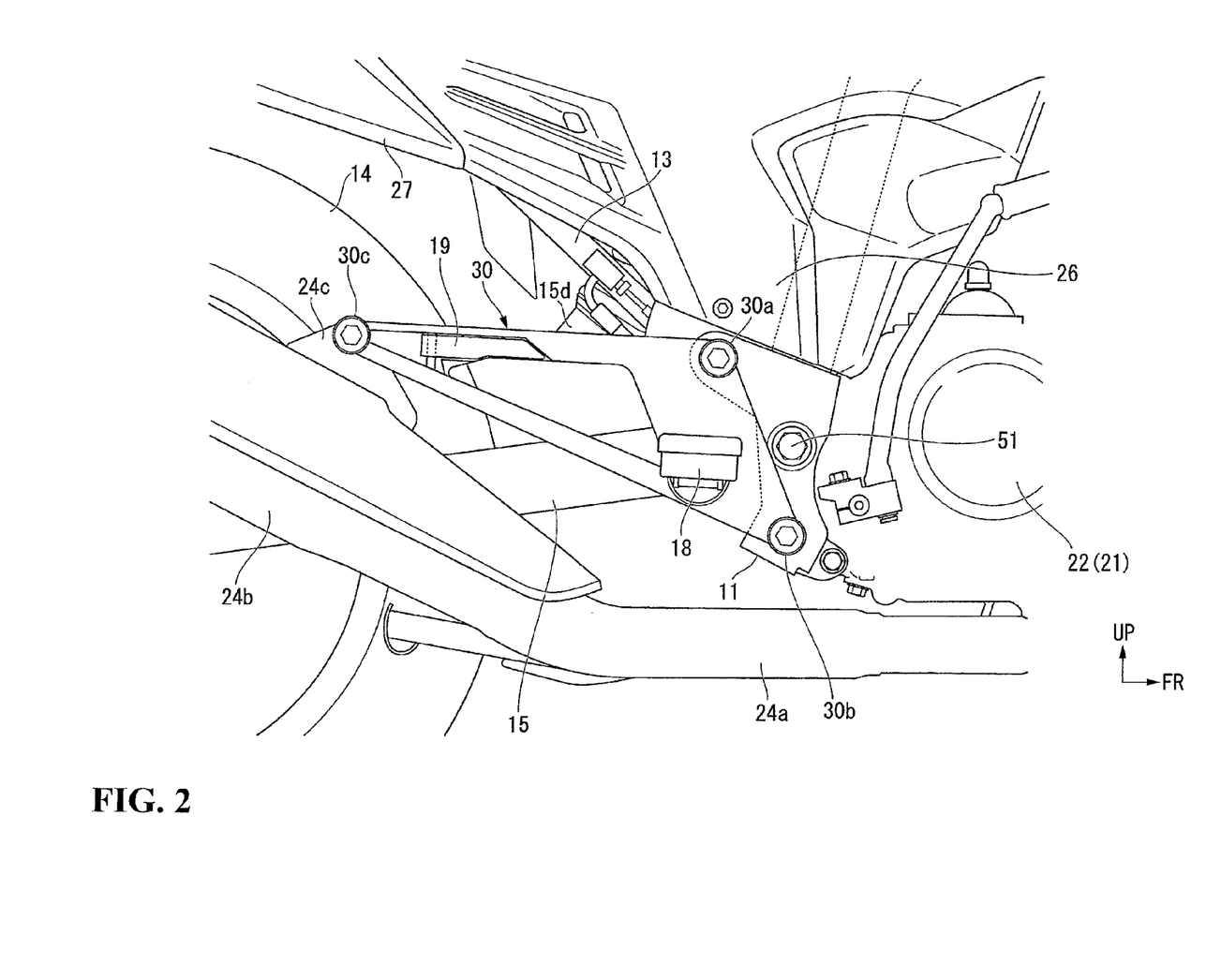
FIG. 2 is a right side view of the motorcycle around steps.

FIG. 2 is a right side view of the motorcycle 1 around the steps.

With reference to FIG. 2 together, the right and left main steps 18 and the right and left pillion steps 19 are respectively supported on a side surface of the pivot bracket 11 through right and left holders.

Hereinafter, a right holder 30 of the right and left holders (hereinafter, the right holder 30 will be merely referred to as the holder 30) will be exemplarily described. The left holder has the same structure as the right holder 30 except for the fact that the shape of the left holder is symmetric with respect to the right holder 30. Therefore, the detailed description of the left holder is omitted.

Figure 3:
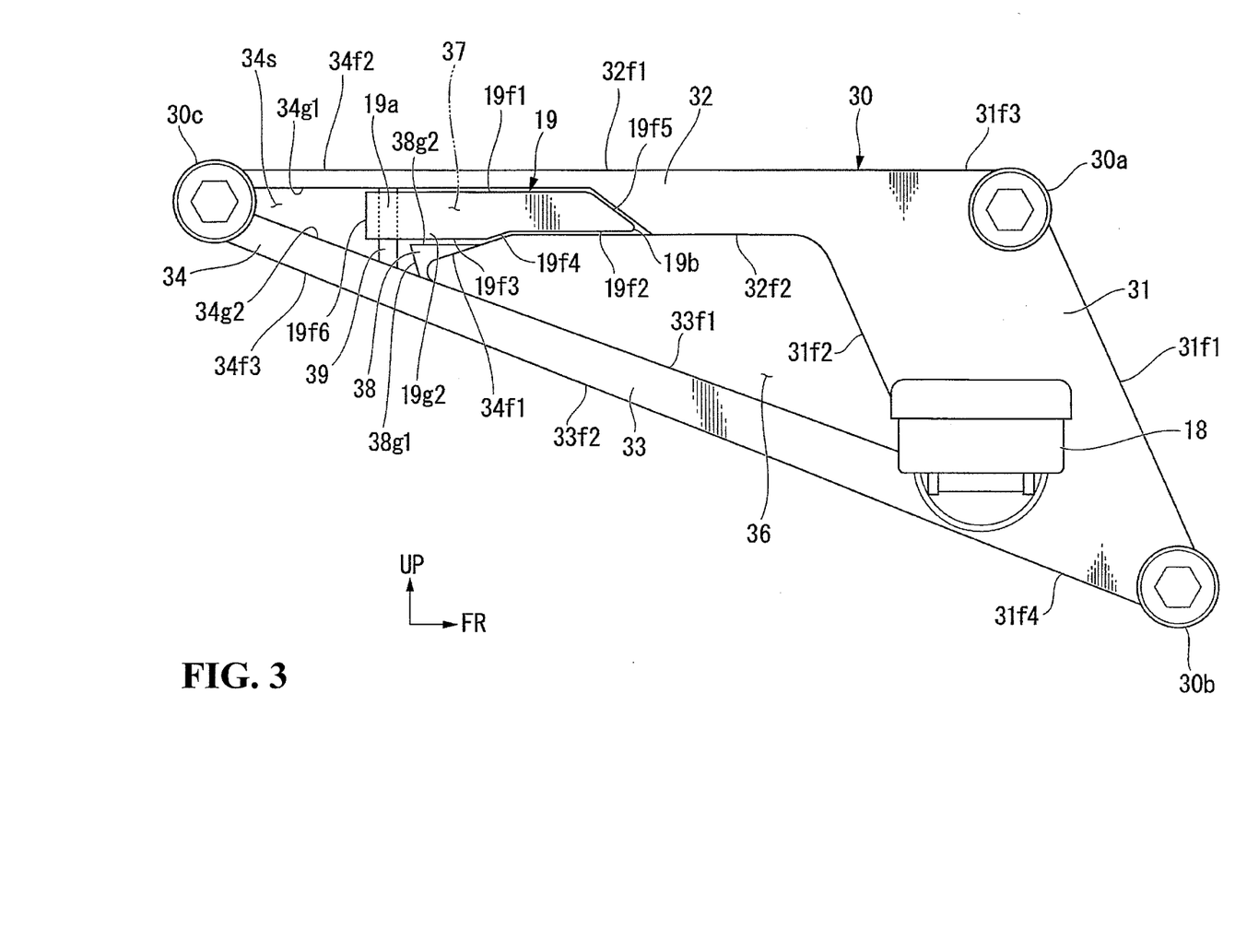
FIG. 3 is a right side view for illustrating a storage state of a pillion step of the motorcycle.

FIG. 3 is a right side view for illustrating the storage state of the pillion step 19 of the motorcycle 1.

The phrase, "the storage state of the pillion step 19" means that the pillion step 19 is made to fall along the side surface of the vehicle. The phrase, "the storage state of the pillion step 19" will be merely referred to as "the storage state."

With reference to FIG. 3 together, the holder 30 includes a front wall portion 31 with a front end of the holder 30, an upper wall portion 32 and a lower wall portion 33 that extends in a rearward direction of the front wall portion 31. In addition, a connection 34 is provided for connecting respective rear ends of the upper wall portion 32 and the lower wall portion 33 with each other. For example, the holder 30 is integrally formed by molding using metal such as iron and aluminum alloy.

A front upper end 30a of the front wall portion 31 is fastened and fixed to an upper portion of a right end of the pivot bracket 11 by a bolt. A front lower end 30b of the front wall portion 31 is fastened and fixed to a lower portion of a right end of the pivot bracket 11 by a bolt.

The front wall portion 31 extends obliquely vertically such that an upper portion is positioned in a rearward direction of the vehicle with respect to a vertical direction of the vehicle. A front surface 31f1 and a rear surface 31f2 of the front wall portion 31 are substantially parallel to each other. The front wall portion 31 has a substantially constant width (a distance between the front surface 31f1 and the rear surface 31f2) in the longitudinal direction of the vehicle, and also has a substantially constant thickness in the vehicle width direction.

The upper wall portion 32 extends in a rearward direction substantially horizontally from the upper rear end of the front wall portion 31. The front end of the upper wall portion 32 is integrally connected with the upper rear end of the front wall portion 31. An upper surface 32f1 and a lower surface 32f2 of the upper wall portion 32 are substantially parallel to each other. The upper wall portion 32 has a substantially constant width (a distance between the upper surface 32f1 and the lower surface 32f2) in the vertical direction of the vehicle, and also has a substantially constant thickness in the vehicle width direction.

The lower wall portion 33 extends in a rearward direction so as to be inclined upwardly toward the rear from the lower rear end of the front wall portion 31. A front end of the lower wall portion 33 is integrally connected with the lower rear end of the front wall portion 31. An upper surface 33f1 and a lower surface 33f2 of the lower wall portion 33 are substantially parallel to each other. The lower wall portion 33 has a substantially constant width (a distance between the upper surface 33f1 and the lower surface 33f2) in the vertical direction of the vehicle, and also has a substantially constant thickness in the vehicle width direction.

The connection 34 is formed to project in a rearward direction of the vehicle so that a vertical width is reduced toward a rear side with respect to the longitudinal direction of the vehicle. A front surface 34f1 of the connection 34 at the front end in the vertical center is inclined so as to face forward and downwardly. The upper front end of the connection 34 is integrally connected with the rear end of the upper wall portion 32. The lower front end of the connection 34 is integrally connected with the rear end of the lower wall portion 33. The connection 34 has a substantially constant thickness in the vehicle width direction.

The front surface 3111 of the front wall portion 31 has an inclined surface that is inclined to face forward and upwardly. An upper surface 3113 of the front wall portion 31, the upper surface 32f1 of the upper wall portion 32, and an upper surface 34f2 of the connection 34 are substantially flush with each other, and as a whole, form a substantially horizontal surface. A lower surface 31f4 of the front wall portion 31, the lower surface 33f2 of the lower wall portion 33, and a lower surface 34f3 of the connection 34 are substantially flush with each other, and as a whole, form an inclined surface that is inclined to face in a rearward direction and downwardly. With this arrangement, the holder 30 is formed into a triangular shape that projects in a rearward direction when viewed from the right surface.

The front wall portion 31, the upper wall portion 32, the lower wall portion 33, and the connection 34 have substantially the same thickness in the vehicle width direction. With this arrangement, the holder 30 is formed into a rectangular shape that extends in the longitudinal direction in the top view.

An opening 36 penetrating through the vehicle width direction is formed in the center of the holder 30 in the vertical and longitudinal directions. The opening 36 is space partitioned by the rear surface 31f2 of the front wall portion 31, the lower surface 32f2 of the upper wall portion 32, the upper surface 33f1 of the lower wall portion 33, and the front surface 34f1 of the connection 34. The opening 36 has a profile substantially similar to a profile of the holder 30 when viewed from the right side, and is formed into a triangular shape that projects in a rearward direction.

Note that the opening 36 is not limited to penetration through the vehicle width direction, and may be opened outwardly in the vehicle width direction.

The holder 30 is formed with a storage portion 37 that is recessed inwardly in the vehicle width direction. The storage portion 37 extends in the longitudinal direction over the rear portion of the upper wall portion 32 and the upper front portion of the connection 34. The storage portion 37 has space large enough to store the pillion step 19. A front lower portion of the storage portion 37 is opened to the opening 36.

The storage portion 37 has a substantially constant width in the vehicle width direction. The pillion step 19 has a substantially constant width in the vehicle width direction in the storage state. The width of the storage portion 37 in the vehicle width direction is set to substantially the same as the width of the pillion step 19 in the vehicle width direction.

Note that the width of the storage portion 37 in the vehicle width direction is preferably larger than the width of the pillion step 19 in the vehicle width direction. With this arrangement, since the whole pillion step 19 can be hidden in the storage portion 37 when viewed from above, it is preferable from the standpoint of improvement of appearance when viewed from above.

A stepped portion 38 is formed in front of the connection 34 and below the storage portion 37. The stepped portion 38 functions as locking means for preventing the pillion step 19 from falling forward in the usage state of the pillion step 19.

The phrase, "the usage state of the pillion step 19" means the state that the pillion step 19 is raised in the vehicle width direction. The phrase, "the usage state of the pillion step 19" will be merely referred to as "the usage state."

A first inclined surface 38g1 forming a rear surface of the stepped portion 38 is formed into an inclined surface that is inclined to face in a rearward direction and downwardly. An upper surface 38g2 of the stepped portion 38 is opposed to an upper inner wall surface 34g1 of the connection 34 across the pillion step 19 in the storage state, and is substantially horizontal to the upper inner wall surface 34g1. The front lower portion of the pillion step 19 is formed with a first inclined portion 19g1 (inclined portion) (see FIG. 5) that is inclined so as to be arranged along the first inclined surface 38g1 of the stepped portion 38 in the usage state of the pillion step 19.

In the usage state of the pillion step 19, the first inclined portion 19g1 functions together with the stepped portion 38 as the locking means that prevents the pillion step 19 from falling forward. The pillion step 19 is moved downward along the shaft 39 in the usage state, so that the first inclined portion 19g1 is locked to the first inclined surface 38g1.

The connection 34 is formed with space 34s that is recessed inwardly in the vehicle width direction. The space 34s is allowed to communicate with the storage portion 37. The space 34s functions as a movement path until the pillion step 19 is put into the usage state from the storage state, and functions also as a movement path until the pillion step 19 is put into the storage state from the usage state.

The space 34s is partitioned by the upper inner wall surface 34g1 of the connection 34, the second inclined surface 34g2 of the connection 34, forming the lower inner wall surface, the first inclined surface 38g1 of the stepped portion 38, and the like. The second inclined surface 34g2 is positioned behind the pillion step 19 in the storage state. The second inclined surface 34g2 is formed into an inclined surface that is inclined to face forward and upwardly. When the pillion step 19 is turned in a rearward direction from the usage state, the pillion step 19 is made to slidably contact with the second inclined surface 34g2, and is moved upwardly.

The rear lower portion of the pillion step 19 is formed with a second inclined portion 19g2 (see FIG. 5) that is inclined so as to be arranged along the second inclined surface 34g2 of the connection 34 in the usage state of the pillion step 19.

The shaft 39 that extends in the vertical direction of the vehicle is provided in the space 34s formed in the connection 34. The shaft 39 is provided at an end 19a of the pillion step 19. An upper end of the shaft 39 is attached to the upper inner wall surface 34g1 (upper inner wall portion) of the connection 34, and a lower end of the shaft 39 is attached to the second inclined surface 34g2 (lower inner wall portion) of the connection 34.

The pillion step 19 is provided turnably around the shaft 39. The pillion step 19 is stored in the storage portion 37 so that the shaft 39 is positioned in the rear portion of the pillion step 19 in the storage state.

The shaft 39, the pillion step 19, and the main step 18 are provided within the holder 30.

The main step 18 is provided in front of the pillion step 19. The main step 18 is attached to a lower portion of the front wall portion 31. The pillion step 19 is made to fall toward a side of the main step 18 in the storage state.

The pillion step 19 extends in the longitudinal direction of the vehicle in the storage state. An end 19b of the pillion step 19 is taperingly formed so that a vertical thickness is reduced toward a front side in the storage state. An upper surface 19f1 of the pillion step 19 is formed substantially horizontally so as to be arranged along the upper inner wall surface 34g1 of the connection 34 in the storage state. A front lower surface 19f2 (operating portion) of the pillion step 19 is formed substantially horizontally so as to be arranged along the lower surface 3212 of the upper wall portion 32 in the storage state. A rear lower surface 19f3 of the pillion step 19 is formed substantially horizontally so as to be arranged along the upper surface 38g2 of the stepped portion 38 in the storage state.

A lower inclined surface 19f4 (operating portion) integrally connected to the front lower surface 19f2 and the rear lower surface 19f3 respectively is provided between the front lower surface 19f2 and the rear lower surface 19f3 of the pillion step 19. The lower inclined surface 19f4 of the pillion step 19 is inclined to face forward and downwardly so as to be arranged along the front surface 34f1 of the connection 34 in the storage state.

A front inclined surface 19f5 integrally connected to the upper surface 19f1 and the front lower surface 19f2 respectively is provided between the upper surface 19f1 and the front lower surface 19f2 of the pillion step 19. The front inclined surface 19f5 of the pillion step 19 is inclined to face forward and upwardly in the storage state.

A rear surface 19fb of the pillion step 19 is formed into a flat surface that faces in a rearward direction in the storage state.

The storage portion 37 is formed along a profile of the pillion step 19. More specifically, the storage portion 37 is partitioned by profile lines formed to be arranged along the upper surface 19f1, the front inclined surface 19f5, the front lower surface 19f2, the lower inclined surface 19f4, the rear lower surface 19f3, and the rear surface 19f6 of the pillion step 19 respectively.

The pillion step 19 has the operating portions 19f2, 19f4 arranged along the edge of the opening 36 in the storage state. More specifically, the operating portions 19f2, 19f4 are positioned in the front lower portion of the pillion step 19, and are arranged along a portion in the storage state, the portion extending from the rear portion of the lower surface 32f2 of the upper wall portion 32 to the front upper portion of the front surface 3411 of the connection 34 from among the surfaces partitioning the opening 36 in the storage state. The operating portions 19f2, 19f4 face inwardly of the opening 36.

The pillion step 19 is arranged in the vicinity of the muffler 24b above the front side of the muffler 24b. The front tops (the front upper end 30a and the front lower end 30b) of the holder

30 are attached to the pivot bracket 11. A muffler stay 24*c* for supporting the muffler 24*b* is attached to a rear top 30*c* of the holder 30.

Hereinafter, the movement of the pillion step 19 will be described using FIG. 4 to FIG. 7.

Firstly, the movement of the pillion step 19 from the storage state to the usage state will be described using FIG. 4 and FIG. 5.

Figure 4:
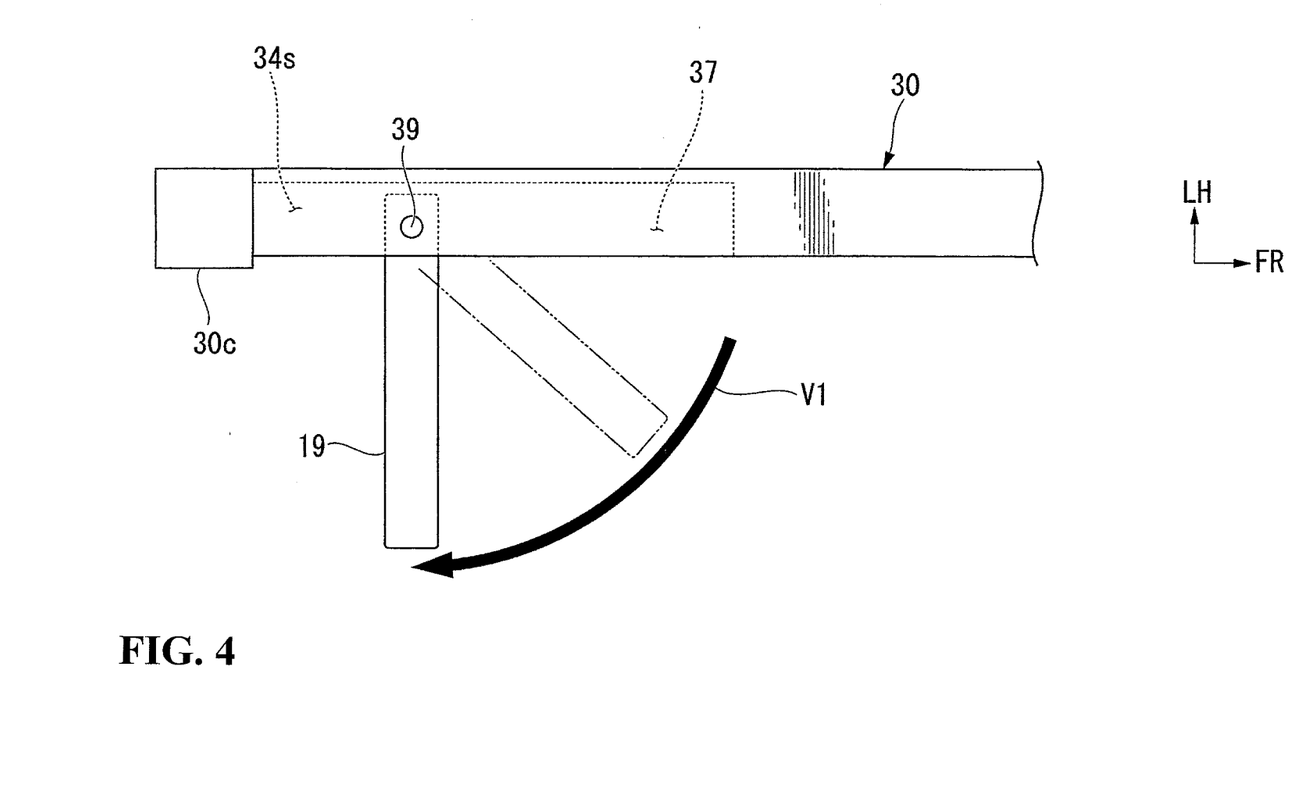
FIG. 4 is a top view for explaining movement of the pillion step of the motorcycle from the storage state to a usage state.

FIG. 4 is a top view for explaining the movement of the pillion step 19 of the motorcycle 1 from the storage state to the usage state.

Figure 5:
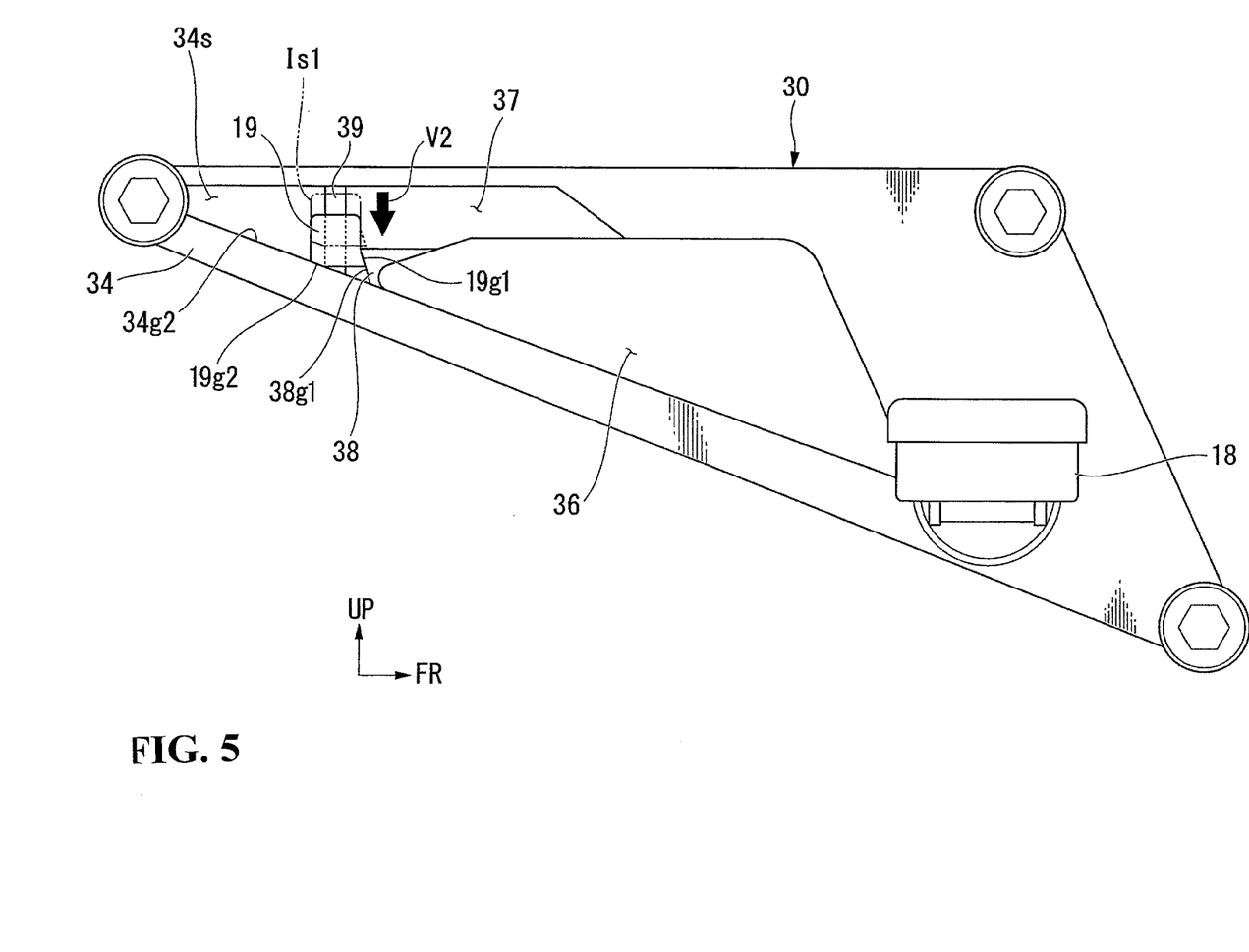
FIG. 5 is a right side view for explaining the movement of the pillion step to the usage state, FIG. 5 being continuous with FIG. 4.

FIG. 5 is a right side view for explaining the movement of the pillion step 19 to the usage state, FIG. 5 being continuous with FIG. 4.

As shown in FIG. 4, when the pillion step 19 is put into the usage state from the storage state, the pillion step 19 is extracted to the right from the storage portion 37, and is turned by about 90 degrees in a clockwise direction V1 around the shaft 38 when viewed from above, so that the pillion step 19 is put into a state arranged along the vehicle width direction (an intermediate state Is1 shown in FIG. 5) from a state arranged along the longitudinal direction of the vehicle. For example, when the pillion step 19 is extracted from the storage portion 37, the pillion step 19 is extracted by grasping the operating portions 19*f*2, 19*f*4 of the pillion step 19 that are opened to the opening 36. Note that the pillion step 19 may be extracted by grasping the right surface of the pillion step 19, the right surface being exposed to the right.

As shown in FIG. 5, the pillion step 19 that is extracted from the storage portion 37 and that is put into the intermediate state Is1 is moved in a downward direction V2 along a direction extending with the shaft 39. Thereby, the pillion step 19 is put into the usage state. In the usage state of the pillion step 19, the first inclined surface 19*g*1 of the pillion step 19 abuts on the first inclined surface 38*g*1 of the stepped portion 38, and also the second inclined portion 19*g*2 of the pillion step 19 abuts on the second inclined surface 34*g*2 of the connection 34.

In the usage state of the pillion step 19, the first inclined portion 19*g*1 of the pillion step 19 abuts on the first inclined surface 38*g*1 of the stepped portion 38. Thereby, the forward movement of the pillion step 19 (turning in a direction opposite to turning in the direction V1 shown in FIG. 4, that is, counterclockwise turning around the shaft 39 when viewed from above) is restricted. For this reason, even if the weight of the pillion passenger seated at the rear is applied to the pillion step 19 from the rear to the front, the forward displacement of the pillion step 19 can be avoided.

On the other hand, in the usage state of the pillion step 19, the rearward movement of the pillion step 19 (turning in the direction V1 shown in FIG. 4) is not restricted. For this reason, even if an impact is applied to the pillion step 19 from the front during operation of the vehicle, the pillion step 19 is displaced in a rearward direction to relieve the impact. Also, since in the usage state of the pillion step 19, the second inclined portion 19*g*2 of the pillion step 19 abuts on the second inclined surface 34*g*2 of the connection 34, the rearward movement of the pillion step 19 is smoothened. For this reason, the impact can be effectively relieved.

Next, the movement of the pillion step 19 from the usage state to the storage state will be described using FIG. 6 and FIG. 7.

Figure 6:
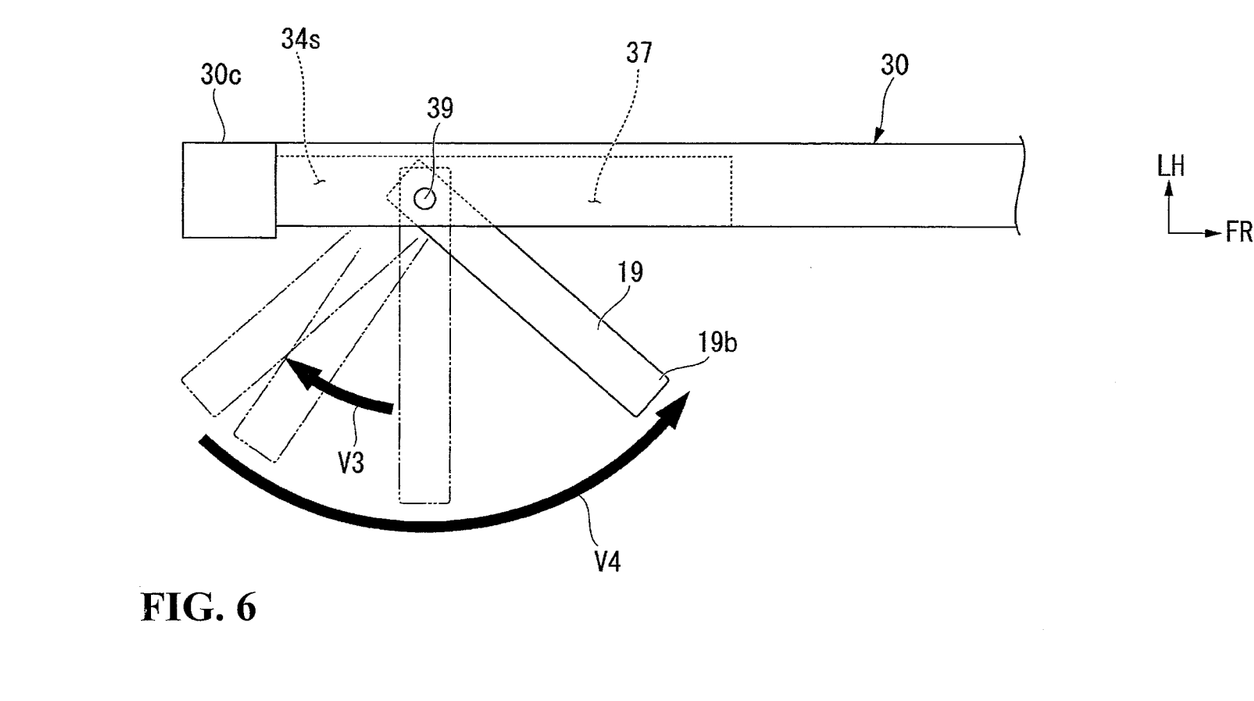
FIG. 6 is a top view for explaining the movement of the pillion step from the usage state to the storage state.

FIG. 6 is a top view for explaining the movement of the pillion step 19 from the usage state to the storage state.

Figure 7:
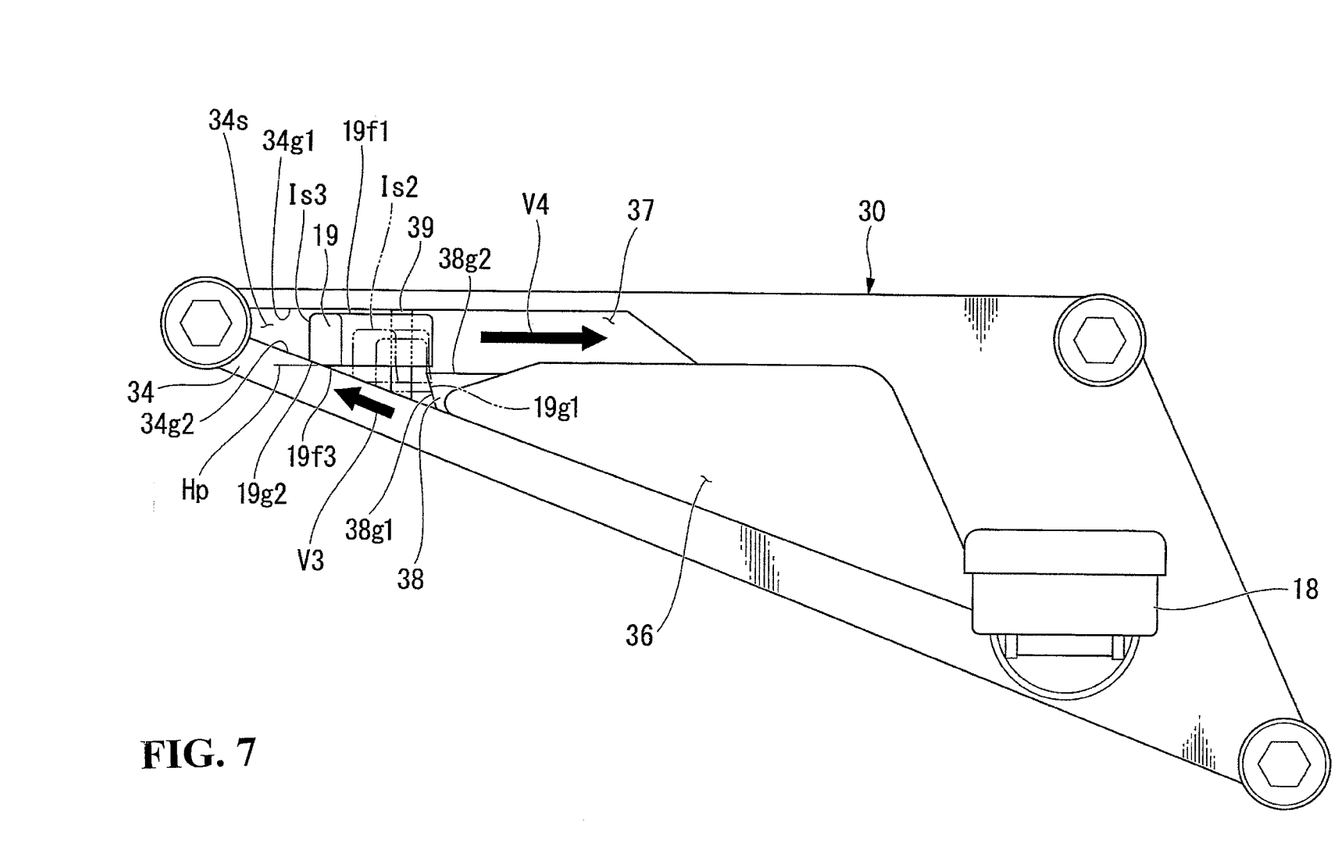
FIG. 7 is a right side view for explaining the movement of the pillion step from the usage state to the storage state.

FIG. 7 is a right side view for explaining the movement of the pillion step 19 from the usage state to the storage state.

As shown in FIG. 6 and FIG. 7, in order to move the pillion step 19 from the usage state into the storage state, firstly, the pillion step 19 is turned by a predetermined angle in a clockwise direction V3 around the shaft 39 when viewed from above, and is moved from a state arranged along the vehicle width direction into a state inclined to the right and in a rearward direction (an intermediate state Is3 after an intermediate state Is2 shown in FIG. 7). In this case, when viewed from the right surface, the pillion step 19 is moved obliquely in a rearward direction and upwardly in such a manner that the second inclined portion 19*g*2 of the pillion step 19 is made to slidably contact with the second inclined surface 34*g*2 of the connection 34. When viewed from the right surface, the pillion step 19 is moved to a position Hp with a vertical position of the rear lower surface 19*f*3 being higher than a vertical position of the upper surface 38*g*2 of the stepped portion 38. For example, when the pillion step 19 is turned clockwise (is moved in a rearward direction and upwardly), clockwise turning of the pillion step 19 may be performed by grasping the end 19*b* of the pillion step 19, the end 19*b* projecting to the right.

Note that in FIG. 7, with regard to such a state that the pillion step 19 is inclined to the right and in a rearward direction, the intermediate state Is2 means such a state that when viewed from the right surface, the vertical position of the rear lower surface 19*f*3 is lower than the vertical position of the upper surface 38*g*2 of the stepped portion 38, and the intermediate state Is3 means such a state that when viewed from the right surface, the vertical position of the rear lower surface 19*f*3 is higher than the vertical position of the upper surface 38*g*2 of the stepped portion 38.

Next, the pillion step 19, moved to the position Hp, is turned by the predetermined angle in a counterclockwise direction V4 around the shaft 39 when viewed from above, and is put from the state inclined to the right and in a rearward direction into the state arranged along the longitudinal direction of the vehicle, thereby achieving the storage state of the pillion step 19. In this case, the pillion step 19 is moved substantially horizontally toward the front side away from the second inclined surface 34*g*2 of the connection 34 when viewed from the right surface. For example, when the pillion step 19 is moved in a forward direction, the upper surface 19*f*1 of the pillion step 19 may be arranged along the upper inner wall surface 34*g*1 of the connection 34.

Since the rear lower surface 19*f*3 of the pillion step 19 is positioned in the position Hp, the first inclined portion 19*g*1 of the pillion step 19 does not abut on the first inclined surface 38*g*1 of the stepped portion 38 when the pillion step 19 is moved in a forward direction. Thereby, restriction on the forward movement of the pillion step 19 (turning in the direction V4 shown in FIG. 6 and FIG. 7) is eliminated. For this reason, the pillion step 19 can be smoothly moved in a forward direction.

Note that in the embodiments, as the step that is turnably provided around the shaft provided at the end of the step and also is stored so that the shaft is positioned at the rear of the step in the storage state, an explanation has been provided with an example applied with the pillion step 19. However, the present invention is not limited to the above-described embodiments. For example, as the step, the main step 18 may be applied, and the respective main step 18 and pillion step 19 may be applied.

As has been described above, according to the above-described embodiments, in the step structure for the saddle-ride type vehicle 1 including the steps 18, 19 that are turned in the freely derricking manner between the usage state raised in the vehicle width direction and the storage state falling along the lateral side of the vehicle, the step 19 is provided turnably around the shaft 39 provided at the end 19*a* of the step 19, and also is stored so that the shaft 39 is positioned at the rear of the step 19 in the storage state.

With this constitution, since the step 19 is made to fall forward so as to be stored, even in the case of the single passenger vehicle, the projection that is directed upwardly to the rear in the side view and that is unnecessary from the standpoint of appearance can be removed. For this reason, the designability of the whole vehicle can be improved.

Also, in the above-described embodiments, the steps 18, 19 include the pillion step 19 that is configured to place the feet of the pillion passenger thereon, and the main step 18 that is arranged in front of the pillion step 19 and that is configured to place the feet of the rider thereon. The pillion step 19 is made to fall toward the side of the main step 18 in the storage state.

With this construction, since the pillion step 19 is made to fall toward the rider when the pillion step 19 is not used, the end 19*b* of the pillion step 19 is brought close to the rider. For this reason, the degree of freedom in design can be improved. Also, in comparison with the structure that the end 19*b* of the pillion step 19 is kept away from the rider, the pillion step 19 can be made inconspicuous.

Also, in the above-described embodiments, the shaft 39, the pillion step 19, and the main step 18 are provided within the holder 30.

With this construction, since the shaft 39, the pillion step 19, and the main step 18 are collected into the holder 30, the shaft 39, the pillion step 19, and the main step 18 are easily assembled in the holder 30. For this reason, productivity can be improved. Also, since it is possible to achieve a design of the shaft 39, the pillion step 19, the main step 18, and the holder 30 that are integrated with each other, the designability can be improved.

Also, in the above-described embodiments, the holder 30 is provided with the storage portion 37 that is recessed inwardly in the vehicle width direction and that is configured to store the pillion step 19.

With this construction, the pillion step 19 can be hidden in the storage portion 37. For this reason, appearance quality in the planar view can be ensured.

Also, in the above-described embodiments, the step structure for the saddle-ride type vehicle further includes the locking means 38 that prevents the pillion step 19 from falling forward in the usage state of the pillion step 19.

With this construction, the locking means 38 prevents the pillion step 19 from falling forward. For this reason, performance of the footrest for the occupant can be ensured.

Also, in the above-described embodiments, the pillion step 19 is provided within the holder 30, the holder 30 is provided with the storage portion 37 that is recessed inwardly in the vehicle width direction, and that is configured to store the pillion step 19, and the locking means 38 is provided with the stepped portion 38 that is formed below the storage portion 37.

With this construction, the stepped portion 38 can reliably and easily prevent the pillion step 19 from falling forward. Also, since the storage portion 37 is arranged above the stepped portion 38, when the pillion step 19 is stored, the pillion step 19 can be manually moved upwardly.

Also, in the above-described embodiments, the stepped portion 38 has the first inclined surface 38*g*1 that is inclined to face in a rearward direction and downwardly, and the pillion step 19 is provided with the first inclined portion 19*g*1 that is inclined to be arranged along the first inclined surface 38*g*1 in the usage state.

Also, the pillion step 19 is moved downwardly along the shaft 39 in the usage state in order to lock the first inclined portion 19*g*1 to the first inclined surface 38*g*1.

With this construction, the pillion step 19 has to be pulled up with the intention when the pillion step 19 is stored. However, the pillion step 19 cannot be pulled up because the first inclined portion 19*g*1 is caught on the first inclined surface 38*g*1 when the pillion step 19 is merely pulled upwardly. More specifically, when the pillion step 19 is stored, the pillion step 19 has to be pulled up once the pillion step 19 is made to fall in a rearward direction. For this reason, the pillion step 19 can be reliably manually pulled up.

Also, in the above-described embodiments, the pillion step 19 is provided within the holder 30, and the holder 30 further has the second inclined surface 34*g*2 on the rear side of the pillion step 19 in the storage state, the second inclined surface 34*g*2 being inclined to face forward and upwardly.

Also, when the pillion step 19 is turned in a rearward direction from the usage state, the pillion step 19 is made to slidably contact with the second inclined surface 34*g*2 and moved upwardly.

With this construction, the pillion step 19 is made to fall in a rearward direction along the second inclined surface 34*g*2 so that the pillion step 19 can be lifted, and the pillion step 19 can be made to fall forward after the pillion step 19 is lifted. For this reason, handleability when the pillion step 19 is stored can be improved.

Also, in the above-described embodiments, the pillion step 19 is provided within the holder 30, the holder 30 is formed with the opening 36 that is opened at least outwardly in the vehicle width direction, and the pillion step 19 has the operating portion 19*f*2 that is arranged along the edge of the opening 36 in the storage state.

With this construction, since such design that the operating portion 19*f*2 of the pillion step 19 and the opening 36 are integrated with each other is achieved, designability can be improved. Also, since the pillion step 19 can be pulled up by the operating portion 19*f*2 of the pillion step 19 arranged along the edge of the opening 36, handleability when the pillion step 19 is stored can be improved.

Also, in the above-described embodiments, the step 19 is provided within the holder 30, the pillion step 19 of the step 19, configured to place the feet of the pillion passenger thereon, is arranged in the vicinity of the muffler 24*b*, the holder 30 is formed into the triangular shape that projects in a rearward direction in the side view, at least the front tops 30*a*, 30*b* of the holder 30 are attached to the vehicle body frame 5, and the muffler stay 24*c* for supporting the muffler 24*b* is attached to the rear top 30*c* of the holder 30.

With this construction, since the pillion step 19 and the muffler stay 24*c* are collected into the holder 30, the pillion step 19 and the muffler stay 24*c* can be easily assembled in the holder 30. As a result, productivity can be improved. Also, the muffler stay 24*c* is attached to the rear top of the holder 30. For this reason, in comparison with the structure that the attaching portion for the muffler stay 24*c* is separately provided, the number of components can be reduced. Also, since such design that the pillion step 19, the muffler stay 24*c*, and the holder 30 are integrated with each other is achieved, designability can be improved.

Note that in the above-descried embodiments, as the locking means for preventing the pillion step 19 from falling forward in the usage state, an explanation has been provided with an example with the holder 30 provided with the stepped portion 38. However, the present invention is not limited to the above-described embodiments. For example, as the locking means, a claw for hooking the pillion step 19 so that the pillion step 19 is prevented from falling forward in the usage state may be provided. Also, as the locking means, a pin for supporting the pillion step 19 so that the pillion step 19 is prevented from falling forward in the usage state may be provided.

Note that the prevent invention is not limited to the above-described embodiments. For example, as the saddle-ride type vehicle, the present invention includes general-purpose vehicles with the rider riding the vehicle astride the vehicle body, and also includes not only motorcycles (including motorized bicycles and scooter vehicles) but also three-wheeled vehicles (including also vehicles having two front wheels and a single rear wheel in addition to vehicles having a single front wheel and two rear wheels) or four-wheeled vehicles.

The construction in the above-described embodiments is one example of the present invention. Various design modification may be made within the scope not departing from the gist of the present invention, for example, constituent elements in the embodiments may be replaced with the well-known constituent elements.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A step structure for a saddle-ride vehicle comprising:
a pillion step pivotable in a freely derricking manner between a usage state extending outwardly in a vehicle width direction and a storage state wherein said pillion step is positioned to extend along a lateral side of the vehicle;
a shaft provided at an end of the pillion step for pivotally mounting the pillion step; and
locking means for selectively preventing the pillion step from movement in a forward direction when said pillion step is in the usage state;
wherein said pillion step is stored with the shaft being positioned at the rear of the pillion step in the storage state.

2. The step structure for a saddle-ride vehicle according to claim 1, wherein the pillion step is configured to place a pillion passenger's feet thereon, and further including a main step arranged in front of the pillion step, said main step being configured to place an operator's feet thereon; and
the pillion step is made to pivot towards the main step when said pillion step is moved to the storage state.

3. The step structure for a saddle-ride vehicle according to claim 2, wherein the shaft, the pillion step, and the main step are mounted on a holder.

4. The step structure for a saddle-ride vehicle according to claim 3, wherein the holder is provided with a storage portion that is recessed inwardly in the vehicle width direction and that is configured to store the pillion step.

5. The step structure for a saddle-ride vehicle according to claim 1, wherein the pillion step is mounted on a holder;
the holder is provided with a storage portion that is recessed inwardly in the vehicle width direction, and that is configured to store the pillion step; and
the locking means is provided with a stepped portion that is formed below the storage portion.

6. The step structure for a saddle-ride vehicle according to claim 5, wherein the stepped portion has a first inclined surface that is inclined to face in a rearward direction and downwardly; and
the pillion step is provided with an inclined portion that is inclined to be arranged along the first inclined surface in the usage state.

7. The step structure for a saddle-ride vehicle according to claim 6, wherein the pillion step is moved downwardly along the shaft in the usage state in order to lock the inclined portion to the first inclined surface.

8. The step structure for a saddle-ride vehicle according to claim 3, wherein the pillion step is mounted on the holder; and
the holder further has a second inclined surface behind the pillion step in the storage state, the second inclined surface being inclined to face forward and upwardly.

9. The step structure for a saddle-ride vehicle according to claim 4, wherein the pillion step is mounted on the holder; and
the holder further has a second inclined surface behind the pillion step in the storage state, the second inclined surface being inclined to face forward and upwardly.

10. The step structure for a saddle-ride vehicle according to claim 8, wherein when the pillion step is turned in a rearward direction from the usage state, the pillion step is made to slidably contact with the second inclined surface and moved upwardly.

11. The step structure for a saddle-ride vehicle according to claim 3, wherein the pillion step is mounted on the holder;
the holder is formed with an opening that is opened at least outward in the vehicle width direction; and
the pillion step has an operating portion that is arranged along an edge of the opening in the storage state.

12. The step structure for a saddle-ride vehicle according to claim 4, wherein the pillion step is mounted on the holder;
the holder is formed with an opening that is opened at least outward in the vehicle width direction; and
the pillion step has an operating portion that is arranged along an edge of the opening in the storage state.

13. The step structure for a saddle-ride vehicle according to claim 3, wherein the pillion step is mounted on the holder;
the pillion step, configured to place the pillion passenger's feet thereon, is arranged in the vicinity of a muffler;
the holder is formed into a triangular shape that projects in a rearward direction in a side view;
at least a front top of the holder is attached to a vehicle body frame; and
a muffler stay for supporting the muffler is attached to a rear top of the holder.

14. The step structure for a saddle-ride vehicle according to claim 4, wherein the pillion step is mounted on the holder;
the pillion step, configured to place the pillion passenger's feet thereon, is arranged in the vicinity of a muffler;
the holder is formed into a triangular shape that projects in a rearward direction in a side view;
at least a front top of the holder is attached to a vehicle body frame; and
a muffler stay for supporting the muffler is attached to a rear top of the holder.

15. A step structure for a saddle-ride vehicle comprising:
a pillion step operatively mounted on a side of the vehicle, said pillion step being pivotable in a freely derricking manner between a usage state extending outwardly in a vehicle width direction and a storage state wherein said pillion step is positioned to extend along a lateral side in the vehicle width direction, said pillion step being configured to place a pillion passenger's feet thereon, and further including a main step arranged in front of the pillion step, said main step being configured to place an operator's feet thereon;
a shaft provided at an end of the pillion step for pivotally mounting the pillion step relative to the vehicle; and wherein said pillion step is stored with the shaft being positioned at the rear of the pillion step in the storage state and the pillion step is made to pivot towards the main step when said pillion step is moved to the storage state.

16. The step structure for a saddle-ride vehicle according to claim 15, wherein the shaft, the pillion step, and the main step are mounted on a holder.

17. The step structure for a saddle-ride vehicle according to claim 16, wherein the holder is provided with a storage portion that is recessed inwardly in the vehicle width direction and that is configured to store the pillion step.

* * * * *